United States Patent
DiRico

(10) Patent No.: US 9,009,694 B2
(45) Date of Patent: Apr. 14, 2015

(54) PRE-VERIFICATION AND SEQUENCING OF PATCHES

(75) Inventor: Nicholas J. DiRico, Andover, MA (US)

(73) Assignee: Oracle America, Inc., Redwood City, CA (US)

( * ) Notice: Subject to any disclaimer, the term of this patent is extended or adjusted under 35 U.S.C. 154(b) by 1900 days.

(21) Appl. No.: 10/222,602

(22) Filed: Aug. 15, 2002

(65) Prior Publication Data

US 2003/0220992 A1   Nov. 27, 2003

Related U.S. Application Data

(60) Provisional application No. 60/382,647, filed on May 22, 2002.

(51) Int. Cl.
G06F 9/44 (2006.01)
G06F 9/445 (2006.01)

(52) U.S. Cl.
CPC ............... *G06F 8/65* (2013.01); *G06F 9/4446* (2013.01)

(58) Field of Classification Search
USPC ................................................. 717/168–178
See application file for complete search history.

(56) References Cited

U.S. PATENT DOCUMENTS

| | | | |
|---|---|---|---|
| 5,586,304 A * | 12/1996 | Stupek et al. | 717/170 |
| 5,721,824 A | 2/1998 | Taylor | |
| 5,805,891 A | 9/1998 | Bizuneh et al. | |
| 5,835,777 A | 11/1998 | Staelin | |
| 5,860,012 A | 1/1999 | Luu | |
| 5,867,714 A | 2/1999 | Todd et al. | |
| 5,872,979 A * | 2/1999 | Edel et al. | 717/170 |
| 5,960,204 A * | 9/1999 | Yinger et al. | 717/176 |
| 5,974,258 A * | 10/1999 | Ferri et al. | 717/178 |
| 5,999,740 A | 12/1999 | Rowley | |
| 6,038,399 A * | 3/2000 | Fisher et al. | 717/178 |
| 6,161,218 A * | 12/2000 | Taylor | 717/174 |
| 6,202,207 B1 * | 3/2001 | Donohue | 717/173 |
| 6,327,706 B1 | 12/2001 | Amberg et al. | |
| 6,347,397 B1 * | 2/2002 | Curtis | 717/170 |
| 6,360,365 B1 * | 3/2002 | Curtis | 717/169 |
| 6,367,075 B1 * | 4/2002 | Kruger et al. | 717/169 |
| 6,442,754 B1 * | 8/2002 | Curtis | 717/175 |
| 6,477,703 B1 * | 11/2002 | Smith et al. | 717/168 |
| 6,529,784 B1 * | 3/2003 | Cantos et al. | 700/79 |
| 6,571,389 B1 * | 5/2003 | Spyker et al. | 717/176 |
| 6,615,405 B1 | 9/2003 | Goldman et al. | |
| 6,681,391 B1 | 1/2004 | Marino et al. | |
| 6,687,902 B1 * | 2/2004 | Curtis et al. | 717/175 |

(Continued)

*Primary Examiner* — Qamrun Nahar
(74) *Attorney, Agent, or Firm* — Robert C. Kowert; Meyertons, Hood, Kivlin, Kowert & Goetzel, P.C.

(57) ABSTRACT

The present invention provides an interactive graphical user interface (GUI) patch environment for installing a patch on the targeted systems. A system administrator or other authorized user interfaced with a machine may perform the installation of a patch on the machine using a software wizard. Additionally, the Wizard pre-verifies the patch dependencies (pre-installed software) required by the patch and checks the target systems to ensure the target systems possess the requisite dependencies. Once the target systems have been validated and the required dependencies identified on the target systems, the sequencing algorithm sorts patches in correct order before applying patches to the target systems. The user can remove the patch from the pre-validated patch list about to be applied to the target system. The patch dependency is checked before removing the patch from the pre-validated patch list for proper removal order.

14 Claims, 6 Drawing Sheets

(56) References Cited

U.S. PATENT DOCUMENTS

| | | |
|---|---|---|
| 6,698,018 B1 | 2/2004 | Zimniewicz et al. |
| 6,847,970 B2 | 1/2005 | Keller et al. |
| 6,859,923 B2 * | 2/2005 | Taylor ............................ 717/172 |
| 6,883,169 B1 * | 4/2005 | Guilbeault et al. ............ 717/178 |
| 6,910,208 B1 | 6/2005 | Zimniewicz |
| 6,976,062 B1 * | 12/2005 | Denby et al. .................. 709/220 |
| 6,983,449 B2 | 1/2006 | Newman |
| 6,996,815 B2 | 2/2006 | Bourk-Dunphy et al. |
| 2001/0056572 A1 * | 12/2001 | Richard et al. .................. 717/11 |
| 2002/0100036 A1 | 7/2002 | Moshir et al. |
| 2002/0133814 A1 * | 9/2002 | Bourke-Dunphy et al. .. 717/174 |
| 2002/0174422 A1 * | 11/2002 | Kelley et al. ................... 717/178 |
| 2003/0159138 A1 * | 8/2003 | Curtis ............................ 717/175 |
| 2003/0163807 A1 * | 8/2003 | Drake et al. ................... 717/174 |
| 2003/0195951 A1 * | 10/2003 | Wittel et al. ................... 709/220 |
| 2003/0218628 A1 | 11/2003 | Deshpande et al. |
| 2003/0221190 A1 | 11/2003 | Deshpande et al. |
| 2003/0233648 A1 * | 12/2003 | Earl et al. ....................... 717/176 |
| 2004/0015946 A1 * | 1/2004 | Te'eni et al. ................... 717/169 |
| 2006/0265708 A1 * | 11/2006 | Blanding et al. .............. 717/174 |

* cited by examiner

PRE-VERIFICATION AND SEQUENCING OF PATCHES

RELATED AND PRIORITY APPLICATIONS

The illustrative embodiment of the present invention is related to two co-pending applications A System and Method For Performing Patch Installation Via a Graphical User Interface and A System and Method For Performing Patch Installation On Multiple Devices filed concurrently with the present application. The present application claims priority to a United States provisional application, Patent Application No. 60/382,647, the contents of which are incorporated herein by reference.

FIELD OF THE INVENTION

The illustrative embodiment of the present invention relates generally to the performance of patch installations on target systems, and more particularly to the pre-verification and sorting of patches before applying the patches to target systems.

BACKGROUND

Software frequently needs to be updated. New technological developments create a need for revisions and changes to existing software in order to maintain interoperability between software components and to enhance the effectiveness of the system utilizing the software. Conventionally, the software updates, or "patches", are installed manually one system at a time. The manual installation of a patch requires the system administrator to review numerous installation files in order to validate the target system. The system administrator must ensure that the system architecture, operating systems, and target applications are all the correct version for the intended patch. The system administrator or other party performing the installation must have a proper authorization to perform the procedure. In addition, the software patch frequently has dependencies of its own which require other additional software to be pre-installed on the target system. The accessibility and the compatibility of the additional software must be verified prior to patch installation. The process of checking dependencies and validating the system is both time intensive and prone to errors due to the interdependent nature of the software components residing on the system being checked.

BRIEF SUMMARY OF THE INVENTION

The illustrative embodiment of the present invention provides an interactive graphical user interface (GUI) patch environment for installing a patch on the targeted systems. The software programmatically validates the target systems for suitability for the patch installation. The patch validating process checks the target system's architecture, operating system version, and packages applied to the target systems with the patch's requirements. Additionally, the Wizard pre-verifies the patch dependencies (pre-installed software) required by the patch and checks the target systems to ensure the target systems possess the requisite dependencies. Once the target systems have been validated and the required dependencies identified on the target systems, the sequencing algorithm sorts patches in correct order before applying patches to the target systems. The user can remove the patch from the pre-validated patch list about to be applied to the target system. The patch dependency is checked before removing the patch from the pre-validated patch list for proper removal order.

DETAILED DESCRIPTION

The illustrative embodiment of the present invention pre-verifies that it is permissible to install a patch or set of patches. In addition, the illustrative embodiment sequences the software patches in correct installation order before applying the patches to target electronic devices. The user selects a patch to install and selects the target devices upon which to install the patch.

The validation process compares the architecture, operating system (OS), packages, and target application attribute of the target device to those required by the patch. Patch dependencies on the target device are also programmatically determined and checked to ensure that software required for the patch is present on the target device. The targeted system is checked whether the patch has been applied and checks for newer or older revision of the patch on the system. The conflict between the patch and the patch presently on the targeted system is checked. Next, the patch and the patch presently on the targeted system are check for causing obsoleteness. The installation of the patch is then performed simultaneously on the validated target devices as a parallel process. The installation of a patch to multiple devices is describes in more detail on copending application, A System and Method For Performing Patch Installation on Multiple Devices.

The illustrative embodiment of the present invention allows the patch removal from the 'patch to add' list. The patch dependencies for the selected patch are checked. The selected patch cannot be removed before its required patch is removed. Once the user is done with selecting all the patches that user wants to remove, the sequence algorithm sorts the patches based on the patch dependencies and layer level. The patches are removed from the 'patches to Add' list to the 'Available Patches' list.

Figure 1:
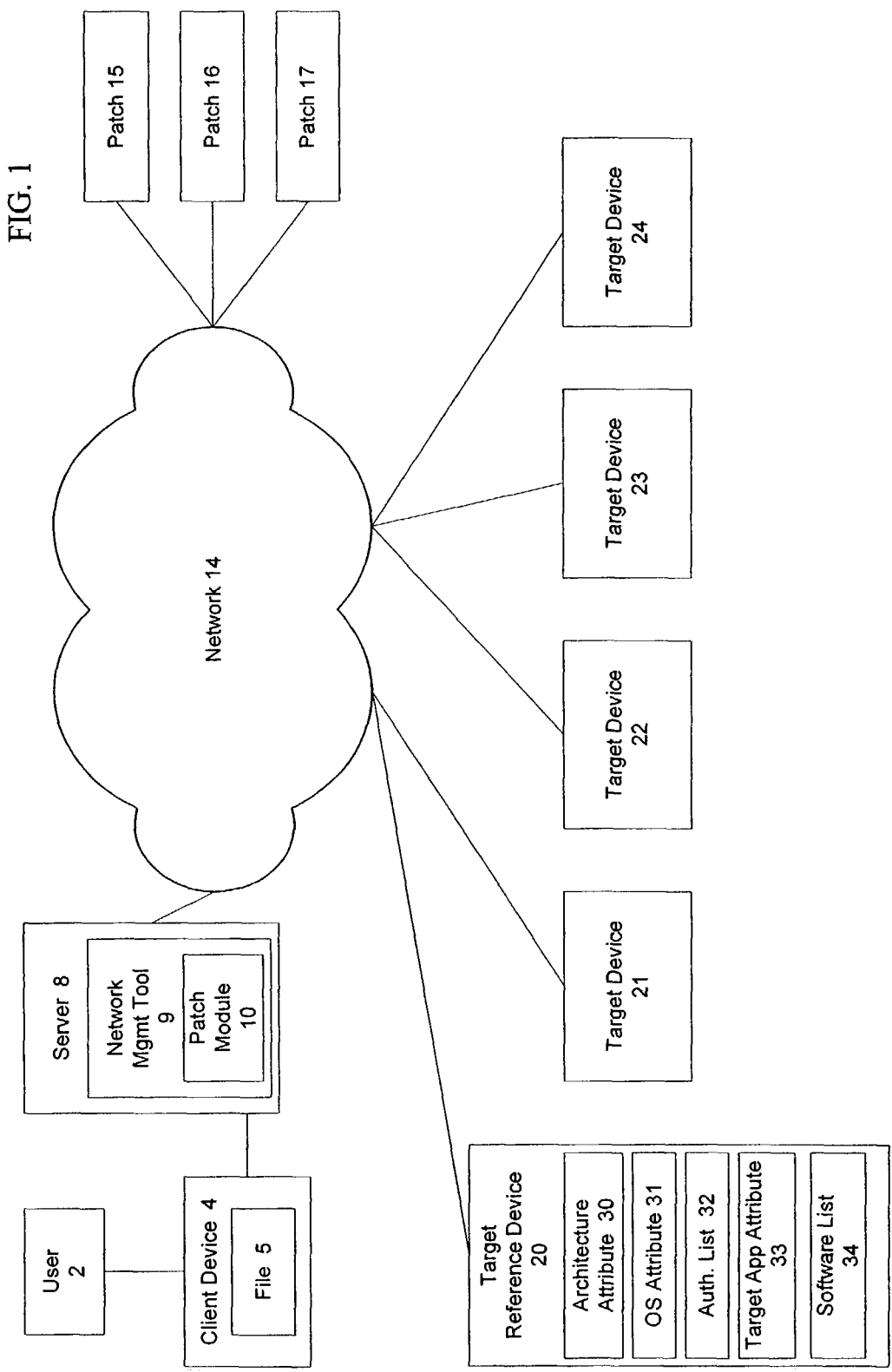
FIG. 1 is a block diagram of an environment suitable for performing the illustrative embodiment of the present invention.

FIG. 1 depicts an environment suitable for practicing the illustrative embodiment of the present invention. A user 2 accesses a client device 4 which is interfaced with a server 8. The client device 4 may be a desktop computer, workstation, PDA, network attached device or some other type of intelligent electronic device that is interfaced with the network 14. The client device 4 may include a text file 5 listing target devices to which a software patch is to be applied. The server 8 includes a network management tool 9. The network management tool 9 includes a patch module 10 used to install software patches on selected target devices. The server 8 is interfaced with a network 14. The network 14 may be a local area network (LAN), wide area network (WAN), an extranet, an Intranet, the Internet, a satellite network or some other type of network. The network 14 is interfaced with a target reference device 20 and a plurality of other target devices 21, 22, 23, and 24. Also, interfaced with network 14 are a plurality of storage locations for storing patches 15, 16, and 17 which are installed on the target devices 20, 21, 22, 23 and 24 after they have been validated and checked for patch dependencies.

The user 2 utilizes the patch module 10 of the network management tool 9 to select target reference devices 20 and other target devices 21, 22, 23, and 24 as possible recipients for software patch updates. The patch module 10 validates the target devices 20, 21, 22, 23 and 24 as suitable to receive the software patches. The validation process analyzes a plurality of attributes related to the target device including an architecture attribute 30, an OS attribute 31 an authorization attribute 32, and a target application attribute 33 collectively, or in some combination. Other numerous attributes related to the target device could be analyzed by those skilled in the art. The architecture attribute identifies the architecture attributes of the target device 20, such as whether the device is using a SPARC 64 bit processor or an Intel™ 32 bit processor. The operating system attribute 31 indicates the operating system and version of the operating system running on the selected target device. The target application attribute 33 identifies the version of the software that the patch is designed to update. Those skilled in the art will recognize that in certain situations the software patch is designed to update an operating system and accordingly the operating system attribute 31 and the target application attribute 33 will be the same in those cases.

Once the target devices 20, 21, 22, 23, and 24 have been validated as suitable for receiving the selected software patch 15, 16 and 17, the patch module 10 can determine the patch dependencies required by the patch selected by the user 2. The software patch 15, 16, and 17 may require other software to be previously installed on the target machine prior to installation (i.e.: it may have a patch dependency). The patch module 10 queries the target devices 20, 21, 22, 23, and 24 to retrieve a software list 34 of the software currently installed on the target devices. The retrieved list of software is checked to verify that it includes any software required by the selected patch 15, 16 and 17. If the target devices 20, 21, 22, 23 and 24 have been validated and the software patch dependencies have been satisfied, the selected patch is installed on the target devices in parallel by splitting the patch into identical threads and simultaneously installing the patch on each of the target devices. Patch dependencies are described in more detail on the co-pending application, A System and Method For Performing Patch Installation Via A Graphical User Interface.

Figure 2:
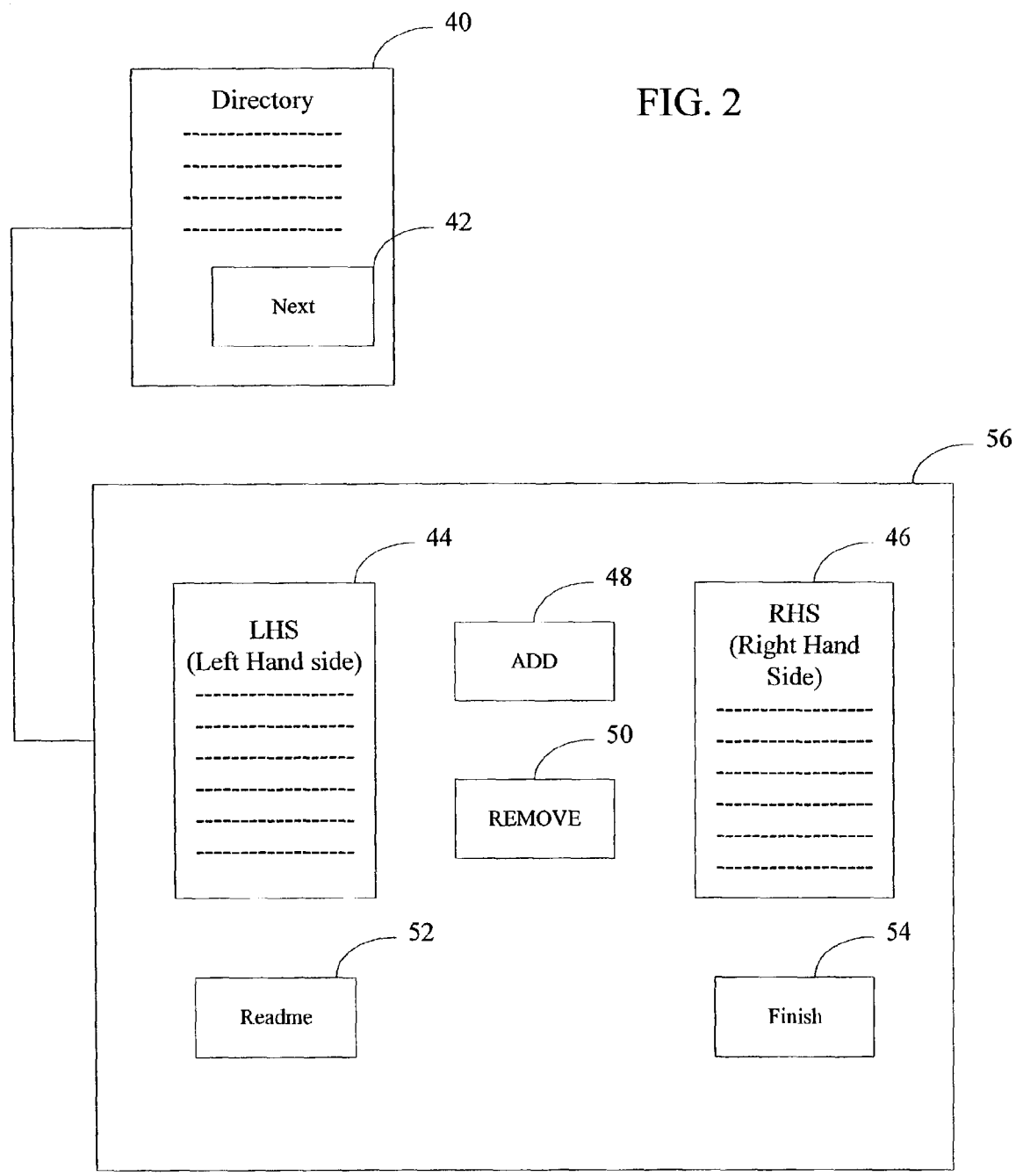
FIG. 2 shows an example of the interactive GUI patch management environment.

FIG. 2 depicts a GUI environment suitable for practicing the illustrative embodiment of the present invention. There is a directory 40 where the patches may be found and which may include a Next reference 42. Those skilled in the art will appreciate that in alternative embodiments, the patches may be stored in different directories or different locations. The user 2. can retrieve the available patches from the directory 40. The Left Hand Side (LHS) 44 shows the 'available patches' that can be applied to the target device. The user can select a patch from the LHS side 44 and move it to the Right Hand Side (RHS) 46 by clicking the ADD button 48. The RHS 46 shows a list of 'patches to add' to the targeted device. The user 2 can select a patch from the LHS and then click the Readme button 52 to get the information about the patch. The REMOVE button 50 moves a patch from RHS 46 to LHS 44. When the user is done with the selections of patches, the Finish button 54 will install the RHS's patches in correct order using the sequencing algorithm.

Those skilled in the art will appreciate that the user interface 56 depicted in FIG. 2 is intended to be illustrative and not limiting of the present invention. Other user interfaces with different elements may be used to practice the present invention. For example, each of the available patches could have separate associated user interface elements. The user interface 56 could include multiple frames and different models.

Figure 3A:
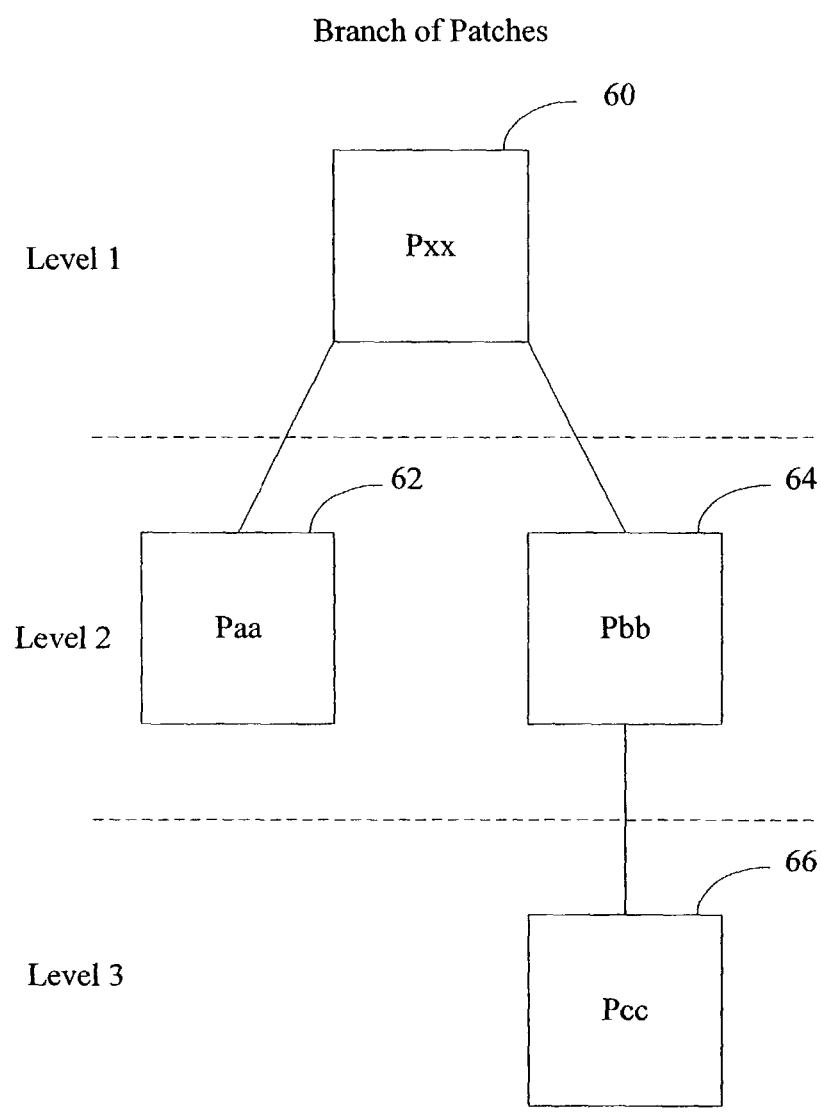
FIG. 3A shows an example of a tree diagram illustrating dependencies among patches.

FIG. 3A shows an example of a group of patches and their dependencies.

Patch Pxx 60 requires patch Paa 62 and patch Pbb 64.
Patch Paa 62 does not require any other patch.
Patch Pbb 64 requires patch Pcc 66.
Patch Pcc 66 does not require any other patch.

In the example of FIG. 3A, the selected patch Pxx 60 is in level 1. The approach employed in the illustrative embodiment checks whether patch Pxx 60 has any child patches and thus requires other patches. In FIG. 3A, patch Pxx 60 has two children: Patch Paa 62 and patch Pbb 64. These patches are at level 2 of the dependency tree shown in FIG. 3A. The process proceeds iteratively; hence the process next checks whether patches Paa 62 and Pbb 64 have any children. In this example, only patch Pbb 64 has a child patch Pcc 66, which is at level 3. The iterative process ends when there are no more children of the patches being examined.

Figure 3B:
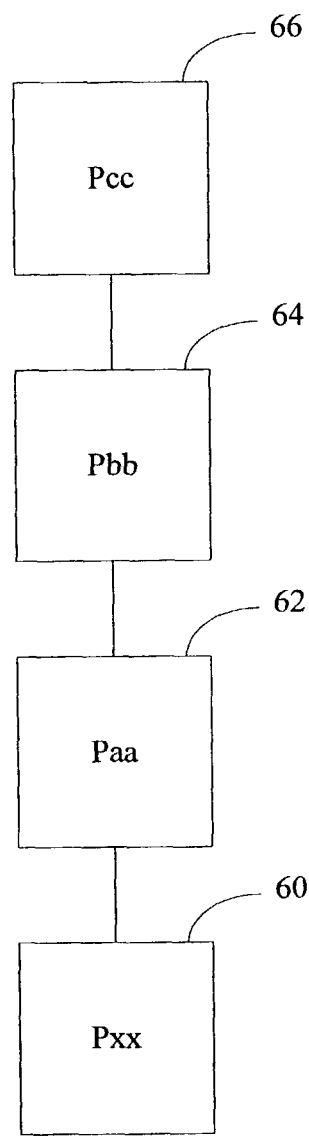
FIG. 3B illustrates an example of an installation sequence for a group of patches.

The patch installation order is shown in FIG. 3B. The order is established such that the lowest level patch that does not require any other patch (patch Pee 66) will be installed first. Once all the patches in the lowest level are installed, the next priority for installation is parent level patches (level 2 in this example). In this example, the parent of patch Pcc 66, which is patch Pbb 64, has the next priority. Patch Paa 62 has a next highest priority because it is in the same level as patch Pbb 64. Lastly, after all the dependent patches are installed, patch Pxx 60 can be installed. Hence, the patch installation order from first installed to last installed is Pec 66, Pbb 64, Paa 62, and Pxx 60.

Figure 4:
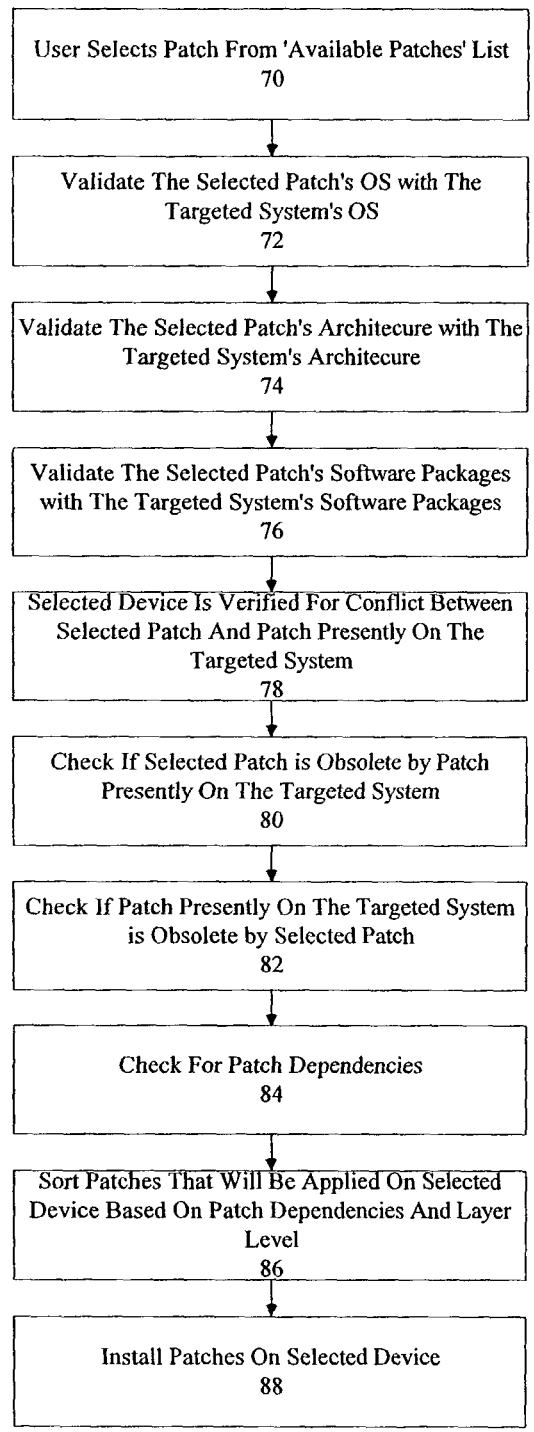
FIG. 4 is a flow chart of the sequence of steps followed by the illustrative embodiment of the present invention to add patches to a target device.
Figure 5:
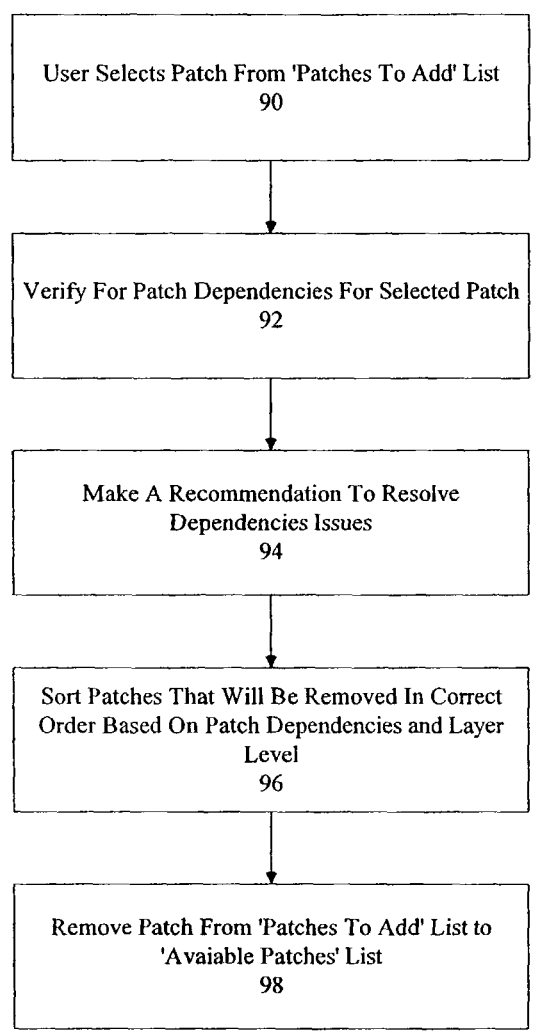
FIG. 5 is a flow chart of the sequence of steps followed by the illustrative embodiment of the present invention to remove patches from the 'Patches to Add' list.

FIG. 4 is a flowchart depicting the sequence of steps followed by the illustrative embodiment of the present invention in applying the patches to the target device. The sequence begins when the user 2 selects a patch from the 'Available Patches' list, 44 (step 70). The selected patch's Operating System (OS) is validated with the target device's OS (step 72). The selected patch's architecture is validated with the target device's architecture (step 74). The selected patch's software packages are validated with the target device's software packages (step 76). The target device is verified for conflict between the selected patch and the patch presently on the targeted device (step 78). Next, a check is initiated to determine if the selected patch is obsolete by the patch presently on the targeted device (step 80). A similar check is initiated to determine if the patch presently on the targeted system is obsolete by the selected patch (step 82). The patch dependencies for the selected patch are then checked (step 84). Once the user 2 is done with selecting all the patches that the user needs, the sequence algorithm sorts the patches based on the patch dependencies and layer level (step 86). The patches are then installed on the target device (step 88).

FIG, 5 is a flowchart depicting the sequence of steps followed by the illustrative embodiment of the present invention to remove the patches from the 'patches to add' list, RHS 46. The sequence begins with the user 2 selects a patch from the 'patches to add' list (step 90). For example, the user may position a mouse cursor to point at a name of a patch and click a mouse button to select the patch. Next, the patch dependencies for the selected patch are checked (step 92). The selected patch cannot be removed before its required patch is removed. For example, if patch A requires patch B, patch A cannot be removed. Patch B. needs to be removed prior to removing patch A. Recommendations to resolve dependencies issues may be made (step 94). Once the user 2 is done selecting all the patches that user wants to remove, the sequence algorithm sorts the patches based on the patch dependencies and layer level (step 96). Next, the patches are removed from the 'patches to add' list (RHS) to 'available patches' list (LHS) (step 98).

Many software patches require other software to be installed on a target device prior to the installation of the patch. The illustrative embodiment of the present invention programmatically checks for the presence of patch dependencies for each selected patch and then verifies the satisfaction of the dependency. Those skilled in the art will recognize that a software dependency for patch may require its own dependency, which in turn requires other dependencies. The patch module 10 checks each generational dependency. If the target device is missing a dependency and the dependency is unavailable (or the user doesn't wish to install the dependency), the target device is dropped from the installation group. Once the selected devices 20, 21, 22, 23, and 24 are determined to satisfy the required patch dependencies, the patch is replicated as duplicate threads which are then installed simultaneously on the target devices in the installation group.

One advantage of the present invention is that the pre-verification process programmatically checks for potential problems prior to applying the patch and notifying the end user. The efficient management of patch applying can save many resources such as manpower, time and system sources.

In one embodiment, the network management tool 9, which includes the patch module 10, may be split between a client portion stored on the client device 4 and a server portion stored on the server 8. Those skilled in the art will recognize that the client and server portion may be located on the same electronic device. In one embodiment, the network management tool 9 may provide a graphical user interface (GUI) such as those found in the Solaris management console from Sun Microsystems, Inc.

In one embodiment, the patch module 10 utilizes the Common Information Model (CIM) to set up a connection with the target devices. The patch module 10 queries the target device for the attributes necessary to execute the installation process. A Common Information Model Object Manager (CIMOM) on the target device enables access to the target device.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In an electronic device that is interfaced with a network to which other devices are interfaced, a method, comprising:
   receiving input selecting a patch to add to a patch list and selecting one or more of the other devices as one or more target devices of an installation group on which to install the selected patch;
   in response to receiving the input, validating whether device hardware architecture and operating system attributes of each of the target devices in the installation group satisfy device hardware architecture and operating system requirements of the selected patch;
   in response to validating that the device hardware architecture and operating system attributes of each of the target devices in the installation group satisfy the device hardware architecture and operating system requirements of the selected patch, determining dependencies for the selected patch, wherein said determining dependencies comprises determining additional software required to be installed prior to installation of the selected patch;
   querying each of the target devices in the installation group to retrieve a respective software list of currently installed software;
   based at least in part on said querying, determining that one or more of the target devices cannot satisfy the determined dependencies for the selected patch and dropping the one or more target devices that cannot satisfied the determined dependences from the installation group;
   determining a sequence in which to install the selected patch and one or more other patches on the patch list, wherein the sequence is based on a reverse order of dependencies between the patches on the patch list; and
   installing, in the determined sequence, the selected patch and the one or more other patches on the patch list on the remaining target devices in the installation group, wherein a given patch of the one or more other patches is not installed on a given device of the remaining target devices if the given patch is listed within the respective software list of the given device.

2. The method of claim 1, wherein the method further comprises:
   in further response to receiving the input and based at least in part on said querying, checking if the selected patch has conflicts with an existing software patch presently on one of the target devices in the installation group.

3. The method of claim 1, wherein the method further comprises:
   in further response to receiving the input and based at least in part on said querying, checking if an existing software patch presently on one of the target devices in the installation group has a conflict with the selected patch.

4. The method of claim 1, wherein the method further comprises:
   in further response to receiving the input and based at least in part on said querying, checking if the selected patch is made obsolete by an existing software patch presently on one of the target devices in the installation group.

5. The method of claim 1, wherein the method further comprises:
   in further response to receiving the input and based at least in part on said querying, checking if an existing software patch presently on one of the target devices in the installation group is made obsolete by the selected patch.

6. The method of claim 1, wherein the method further comprises:
   in further response to receive the input and based at least in part on said querying, validating one or more packages for the selected patch with one or more packages for one of the target devices.

7. In an electronic device that is interfaced with a network to which other devices are interfaced, a non-transitory, computer-readable storage medium holding computer-executable steps for a method, said method comprising:

receiving input selecting a patch to add to a patch list and selecting one or more of the other devices as one or more target devices of an installation group on which to install the selected patch;

in response to receiving the input, validating whether device hardware architecture and operating system attributes of each of the target devices in the installation group satisfy device hardware architecture and operating system requirements of the selected patch;

in response to validating that the device hardware architecture and operating system attributes of each of the target devices in the installation group satisfy the device hardware architecture and operating system requirements of selected patch, determining dependencies for the selected patch, wherein said determining dependencies comprises determining additional software required to be installed prior to installation of the selected patch;

querying each of the target devices in the installation group to retrieve a respective software list of currently installed software;

based at least in part on said querying, determining that one or more of the target devices cannot satisfy the determined dependencies for the selected patch and dropping the one or more target devices that cannot satisfied the determined dependences from the installation group;

determining a sequence in which to install the selected patch and one or more other patches one the patch list, wherein the sequence is based on a reverse order of dependencies between the patches on the patch list; and installing, in the determined sequence, the selected patch and the one or more other patches on the patch list on the remaining target devices in the installation group, wherein a given patch of the one or more other patches is not installed on a given device of the remaining target devices if the given patch is listed within the respective software list of the given device.

8. The non-transitory, computer-readable storage medium of claim 7, wherein the method further comprises:
in further response to receiving the input and based at least in part on said querying, checking if the selected patch has conflicts with an existing software patch presently on one of the target devices in the installation group.

9. The non-transitory, computer-readable storage medium of claim 7, wherein the method further comprises:
in further response to receiving the input and based at least in part on said querying, checking if an existing software patch presently on one of the target devices in the installation group has a conflict with the selected patch.

10. The non-transitory, computer-readable storage medium of claim 7, wherein the method further comprises:
in further response to receiving the input and based at least in part on said querying, checking if the selected patch is made obsolete by an existing software patch presently on one of the target devices in the installation group.

11. The non-transitory, computer-readable storage medium of claim 7, wherein the method further comprises:
in further response to receiving the input and based at least in part on said querying, checking if an existing software patch presently on one of the target devices in the installation group is made obsolete by the selected patch.

12. The non-transitory, computer-readable storage medium of claim 7, wherein the method further comprises:
in further response to receiving the input and based at least in part on said querying, validating one or more packages for the selected patch with one or more packages for one of the target devices in the installation group.

13. The method of claim 1, further comprising:
prior to said installing, receiving input to remove a patch from the patch list;
in response to receiving the input to remove a patch from the patch list, determining whether the patch to be removed has any required dependencies on the patch list; and
preventing removal of the patch from the patch list in response to determining that the patch has a required dependency on the patch list.

14. The non-transitory, computer-readable storage medium of claim 7, wherein the method further comprises:
prior to said installing, receiving input to remove a patch from the patch list;
in response to receiving the input to remove a patch from the patch list, determining whether the patch to be removed has any required dependencies on the patch list; and
preventing removal of the patch from the patch list in response to determining that the patch has a required dependency on the patch list.

* * * * *